United States Patent
Chheda et al.

(10) Patent No.: US 7,596,792 B2
(45) Date of Patent: Sep. 29, 2009

(54) METHOD AND SYSTEM FOR SUPPORTING A PLURALITY OF EVENT TYPES

(75) Inventors: Sachin N. Chheda, Roseville, CA (US); Susan K. Radford, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1110 days.

(21) Appl. No.: 10/212,692

(22) Filed: Aug. 7, 2002

(65) Prior Publication Data

US 2004/0031040 A1 Feb. 12, 2004

(51) Int. Cl.
G06F 3/00 (2006.01)
G06F 11/00 (2006.01)
G06F 13/24 (2006.01)

(52) U.S. Cl. .................... 719/318; 714/39; 714/48; 710/260

(58) Field of Classification Search .......... 719/318, 719/310; 714/39, 48; 710/260
See application file for complete search history.

(56) References Cited

U.S. PATENT DOCUMENTS

| | | | | |
|---|---|---|---|---|
| 5,237,684 | A | * | 8/1993 | Record et al. ............ 719/318 |
| 5,564,015 | A | * | 10/1996 | Bunnell ..................... 714/47 |
| 5,909,549 | A | | 6/1999 | Compliment et al. |
| 6,219,742 | B1 | * | 4/2001 | Stanley ..................... 710/260 |
| 6,253,243 | B1 | | 6/2001 | Spencer |
| 6,292,472 | B1 | | 9/2001 | Rariden et al. |
| 6,367,034 | B1 | * | 4/2002 | Novik et al. .............. 714/39 |
| 6,421,667 | B1 | * | 7/2002 | Codd et al. ................ 707/4 |
| 6,460,105 | B1 | * | 10/2002 | Jones et al. ............... 710/268 |
| 6,611,877 | B2 | * | 8/2003 | Korn et al. ................ 719/318 |
| 6,725,384 | B1 | * | 4/2004 | Lambino et al. .......... 713/320 |
| 2001/0052010 | A1 | | 12/2001 | Kim |

FOREIGN PATENT DOCUMENTS

WO  WO 02/47330  6/2002

OTHER PUBLICATIONS

Search Report issued on Jan. 13, 2004 in counterpart foreign application in GB under application No. 317110.5.

* cited by examiner

Primary Examiner—Wei Zhen
Assistant Examiner—Lechi Truong

(57) ABSTRACT

The present invention provides a method and system that is capable of identifying an event type from a plurality of event types to direct an event translator to determine an event occurrence based on the event type. A method is provided for identifying the event type from a plurality of event types, determining an event occurrence based on the event type; and communicating the event occurrence. A system is also described.

12 Claims, 5 Drawing Sheets

METHOD AND SYSTEM FOR SUPPORTING A PLURALITY OF EVENT TYPES

TECHNICAL FIELD

The technical field of the present invention relates generally to event translation, and more particularly to a method and apparatus for supporting a plurality of event types.

BACKGROUND

An event translator is typically required to determine if an event has occurred. The determination typically requires receiving an event signal from an event source, evaluating the event signal, and communicating the event occurrence. The various types of events can be broadly described in two categories: edge events, and level events. The determination of an edge event is different from the determination of a level event.

An event may be described as an occurrence or happening of significance to a computer system. A level event may be described as an event whose occurrence is signified by the change of state of the signal such as a voltage crossing a threshold. An edge event may be described as an event whose occurrence is signified by a pulse such as a monetary button press. Advantageously, the present invention is capable of supporting a plurality of event types, such as for example both level and edge based events.

Unfortunately, a conventional event translator provides support for only a single event type, such as either an edge event or a level event. Different types of events are not supported by conventional event translator. Ideally the event translator could be configured to support event types, such as either an edge event or a level event. What is desired is a capability for the event translator to identify an event type from a plurality of event types to direct an event translator to determine an event occurrence based on the event type.

SUMMARY

The present invention provides a method and system that is capable of identifying an event type from a plurality of event types to direct an event translator to determine an event occurrence based on the event type. A method is provided for identifying the event type from a plurality of event types, determining an event occurrence based on the event type; and communicating the event occurrence.

A system for identifying an event is also described. The system comprises a first data path for use in identifying an event type from a plurality of event types by evaluating an event type register; a second data path for use in receiving at least one event signal from an event source; a memory for storing logic for evaluating the at least one event signal over a predetermined duration; a third path for use in communicating a determined event. A processor for determining the determined event using said first data path, said second data path, and processing said logic.

DESCRIPTION OF THE DRAWINGS

The detailed description will refer to the following drawings, wherein like numerals refer to like elements, and wherein.

DETAILED DESCRIPTION

Figure 1:
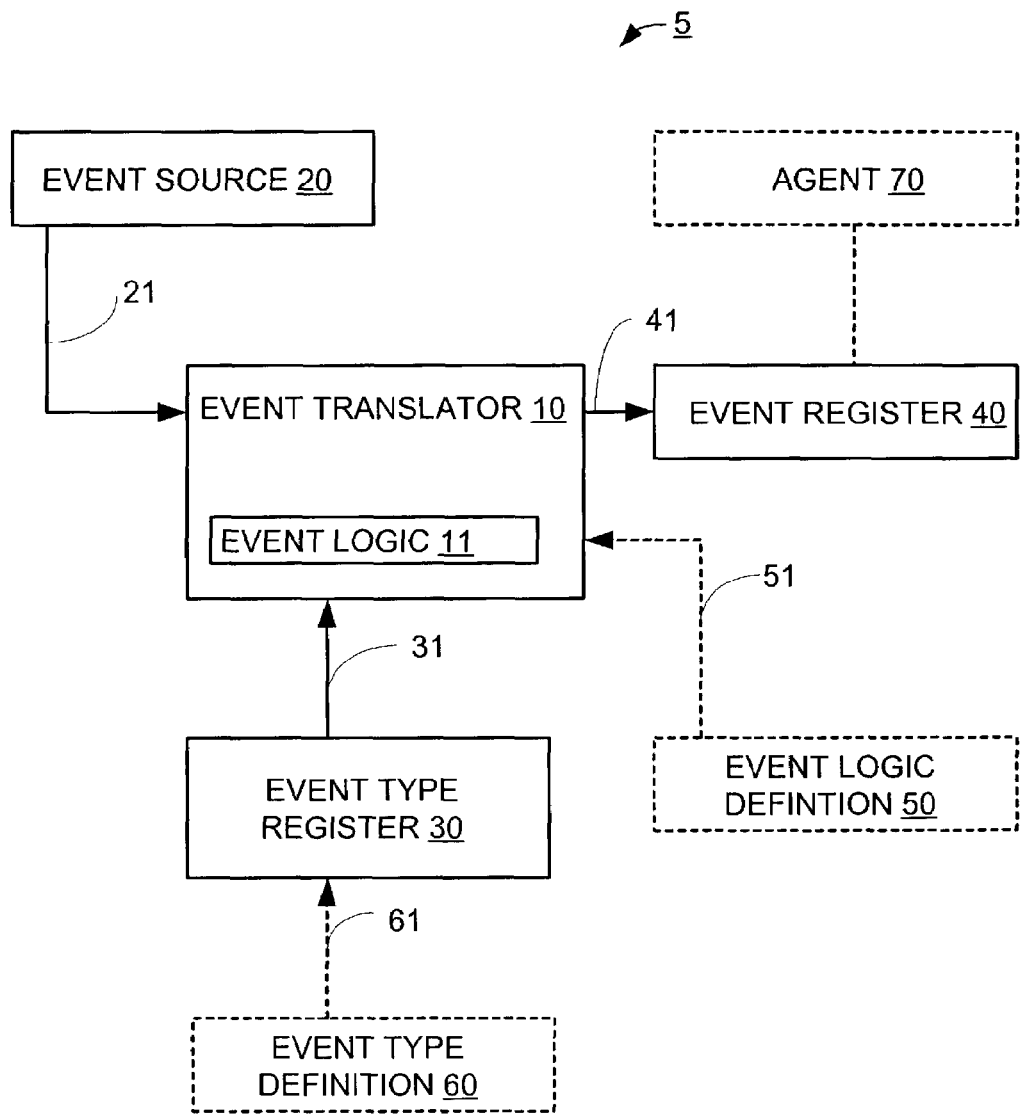
FIG. 1 shows a schematic block diagram of an event translator.

FIG. 1 shows a block diagram of a system 5 comprising an event source 20, an event register 40, an event translator 10 including a first input port 21, a second input port 31, an output port 41, event logic 11 to perform the processing, and a third input port 51 to define the event logic 11 according to an event logic definition 50, and an event type register 30 with an input port 61 to define the event type according to an event type definition 60.

The first input port 21 may be used to receive event signals from an event source 20 over a duration of time. The event signal may include a number of values, typically including a first value and a second value. In one embodiment, the first value corresponds to an inactive value, and the second value corresponds to an active value. The second input port 31 may be used to determine the event type, such as for example, an edge event type or a level event type. The third input port 51 may be used to define the event logic 11. The event logic 11 may be used to monitor for an event occurrence based on evaluating event signals and the determined event type. If an event occurrence is determined then the output port 41 may be used to communicate the event occurrence. The event translator may perform these functions cyclically. Further, the input and output ports may be combined in a variety of ways, including using a single bi-directional bus that supports some and/or all communication with the event translator 10.

Advantageously, the event logic 11 may be configured to process one of a variety of different types of events, such that the event type is used to control the processing associated with the event logic 11. Accordingly, if the event type corresponds to an edge event then the event logic 11 uses the logic corresponding to an edge event. And, if the event type corresponds to a level event then the event logic 11 uses the logic corresponding to a level event. A reference clock cycle may also be used in conjunction with the event logic to support the determination of an event.

In one embodiment, the event logic 11 is capable of supporting logic associated with a plurality of different event types, but uses the logic associated with a specific event type to monitor for an event occurrence based on the event type. The event type stored may be in the event type register 30, which is accessible to the event logic 11 according to the second input port 31. In another embodiment, each event translator in a group of event translators can be configured individually or as a group, to perform the logic corresponding to a common event type.

If an event occurrence is determined, then the event occurrence is communicated to an agent 70. According to one embodiment, the event may be communicated utilizing the output port 41 to an event register 40. This functionality provides the flexibility of notifying an agent and allowing the agent to decide how to process the event occurrence. The agent may include a second system, an operating system, a firmware system, other potential systems and any combination thereof. The agent may react to the event according to a reaction strategy that may include clearing the event register 40 to facilitate notification of a similar event.

Figure 2:
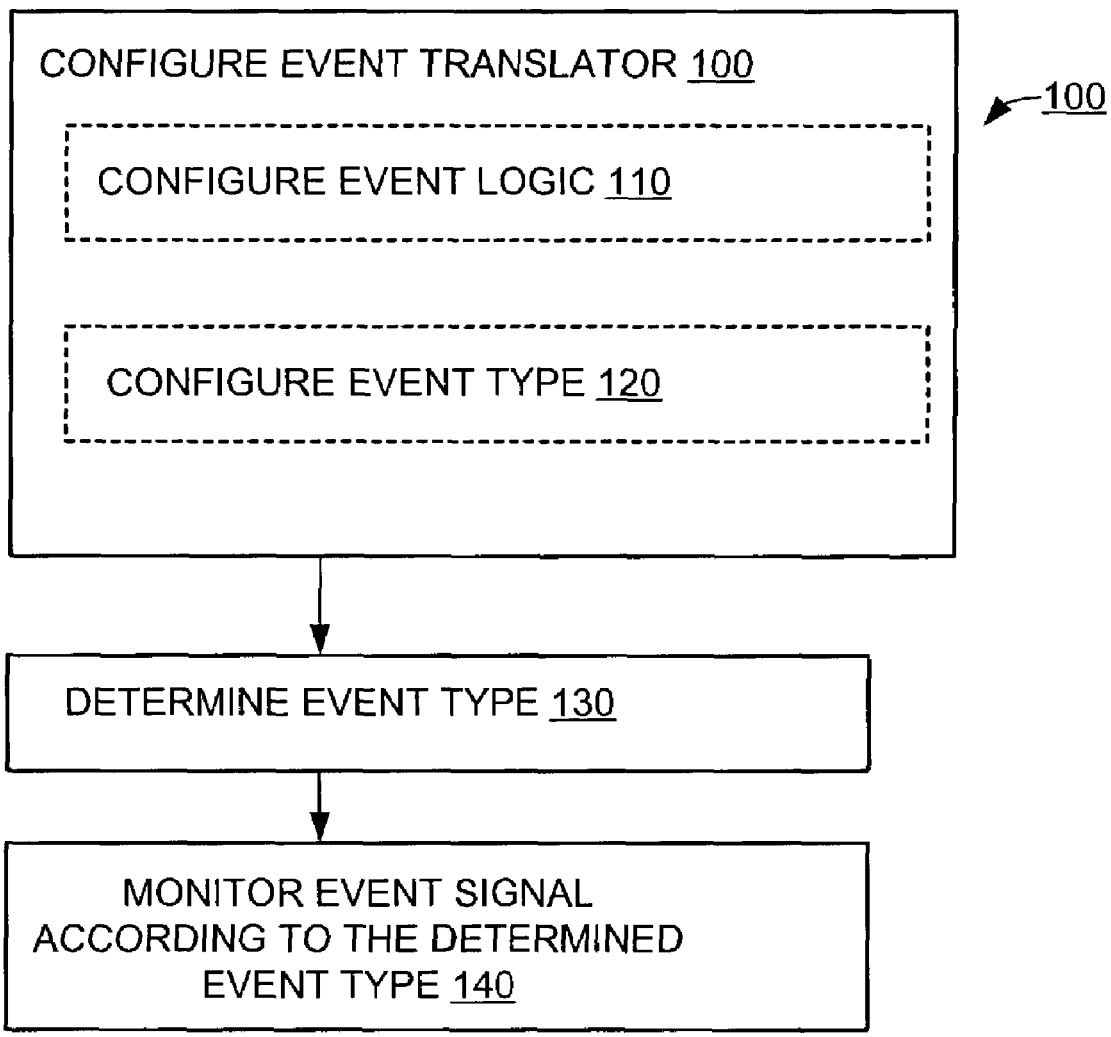
FIG. 2 is a diagrammatic flow chart corresponding to configuring the event translator according to one embodiment of the inventive method.

FIG. 2 illustrates an exemplary method 100 for the configuration of the event translator, which may include configuring the event logic 110 and configuring the event type 120. After configuration 100, the event translator typically determines the event type 130 and begins monitoring event signals associated with determined event type 140.

Advantageously, a computer program for configuring the event translator 100 may be programmed to support the functionality of the event translator and may be defined using a high-level language. Verilog is an exemplary common high-level language known in the art of event translators that may be used. Configuring the event logic 110 may include programming (not shown) the event logic 11. The functionality of event logic typically corresponds with the event type or a plurality of event types. If the event type is a level event type, then the event logic supports determining the occurrence of a level event. In one embodiment, the event logic definition 50 may be generated by configuring the event logic 110.

Configuring the event logic 110 may include configuring logic for identifying the event type corresponding to the event translator, for monitoring for an event occurrence based on the event type, and for communicating an event occurrence, if the event occurs. The event occurrence may be communicated with an optional agent 70. Monitoring for the event occurrence based on the event type typically includes receiving at least one event signal from an event source 20. The event signal may include a range of values such as a first value and a second value. The monitoring for an event occurrence may determine an event occurrence when the event signal changes, for example, going from the first value to the second value, going from the first value to the second value and back to the first value, and/or vice versa. A variety of other transitions that may be monitored will be appreciated by one skilled in the art, such as transitions from a positive to a negative event signal and transitions from an open to a closed event signal.

Monitoring for an event occurrence may also use reference clock cycles to defining a duration of time. According to one embodiment the event logic may require waiting three reference clock cycles and verifying that the event signal occurred over a period of time such as, for example, over at least one reference clock cycle, before signaling an event occurrence. Further the event logic may set and clear an event register to store information pertaining to an event occurrence.

The event translator may be configured 100, including configuring the event logic 110 and configuring the event type 120. According to one embodiment, a field programmable gate array (FPGA) may be used to define the event logic 11. This allows the event logic 11 to be configured 110 when the system is powered up. The configuration 100 may be generated through the utilization of Verilog code. Conventional microprocessors may be described using a language such as Verilog, or VHDL before they are laid out on silicon. Correspondingly, the event translator 10, event type register 30, and event logic 11 may be configured using similar languages.

Advantageously, a variety of event types can be supported by the same event translator. The present invention allows an event translator 10 and/or event logic 11 to be configured and/or reconfigured to support different event types, such as supporting either an edge event type or a level event type. The event types may be user configurable, such as for example, Verilog code may be developed by a user to support configuring the event translator 100. Alternatively, the event logic 11 can access the event type register 30, which may also be accessible by a user.

Advantageously, a separate chipset is not required to support various event translators. The present invention allows the reconfiguration of event translators 10 based on the event type register 30 to identify the event type. Based on the event type, the event logic is capable of determining an event occurrence. The event type may be stored in the event type register 30, which may be a memory location that may be accessible and/or initialized by software or firmware.

According to one embodiment, the event type for a given event translator may be established at system start up and/or during an initialization process. Advanced Configuration and Power Interface (ACPI) can be used to configure the event translator 100. According to one embodiment, an ACPI table may be created such that the operating system(s) may use the ACPI table to configure the event type, such as determining and/or initializing the event type. The event type may be defined in the event type register 30 and used to direct the event logic 11 of the event translator 10.

An ACPI table may be used by an operating system to determine the event type. Advantageously, this provides an effective way of initializing the event type register 30. According to one embodiment, the event type register 30 is initialized during system power up. Selected event translators 10 may process event signals as level events, and other event translators may process event signals as edge events. Advantageously, this functionality provides a unique ability to mix and match the functionality of various event translator.

Figure 3:
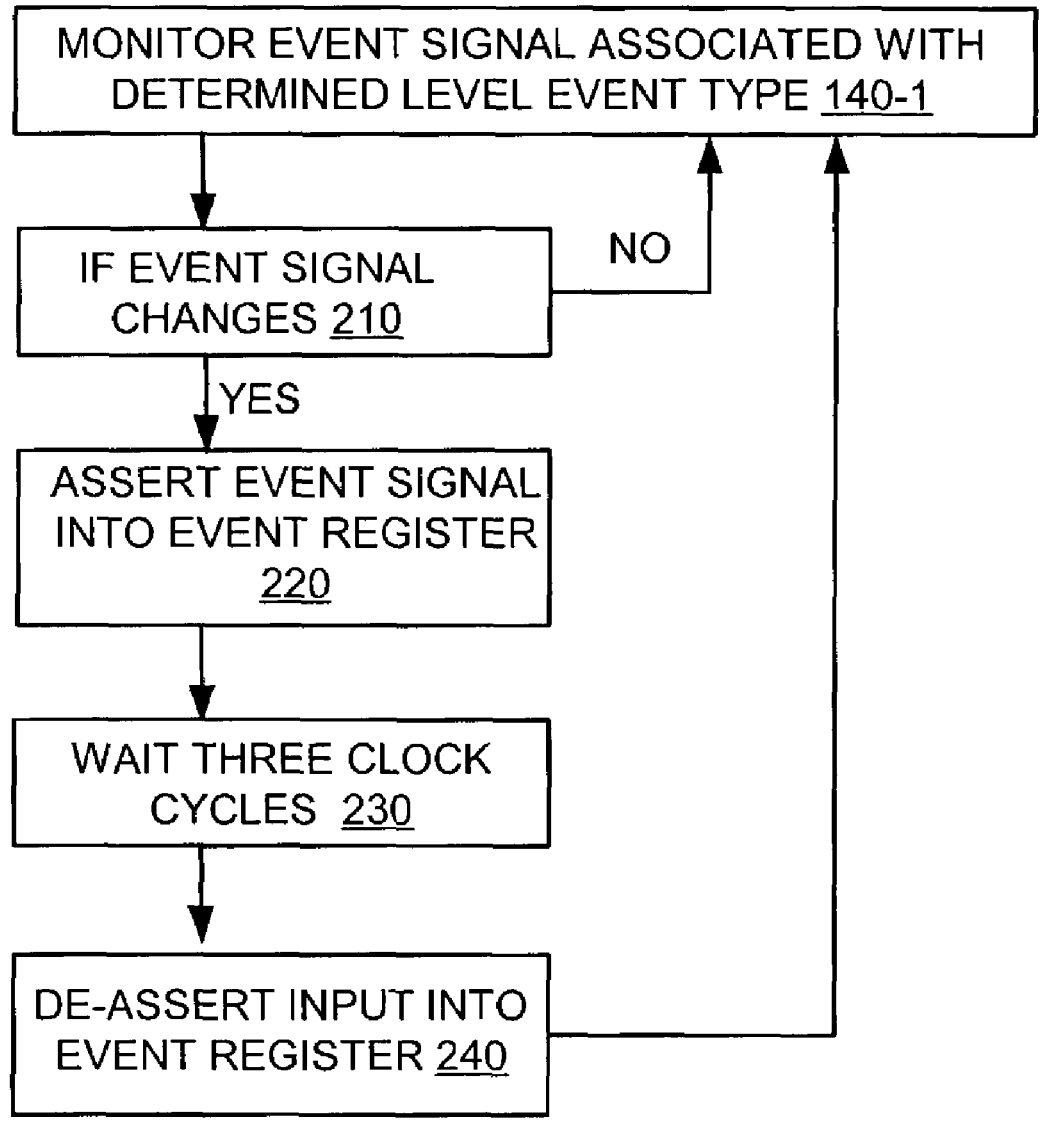
FIG. 3 is a diagrammatic flow chart of one embodiment of the inventive method.

FIG. 3 describes an exemplary method 200 of determining an event occurrence for a level event type. Accordingly, if the event type is a level event then the event logic 11 associated with a level event type is used to determine an event occurrence 200 based on the event type. Determining an event occurrence 200 may include monitoring the event signal 140-1, and determining if the event signal changes 210. If the event signal does not change then the method 200 returns to monitoring the event signal 140-1. If the event signal changes then the event logic may assert the event signal into the event register 220. After asserting the event signal into the event register 220, the event logic 11 may initiate a delay such as, for example, waiting for three clock cycles 230. After the delay, the event logic 11 may de-assert the input into the event register 240 and return to monitoring the event signal 140-1. Advantageously, the event type may be selected to correspond to the event source, such as the lid opening and closing on a laptop computer, or the pressing of a button.

An example level event may be associated with a sensor associated with the lid (i.e. the screen-portion) of a laptop computer system. Opening the lid would change the event signal 210 from an inactive state to an active state. The event signal is asserted into an event register at 220, followed by waiting for three clock cycles 230 and then de-asserting the input into the event register 240. A long period of time may pass before the event source 20 is cleared or returns to an inactive state. When the lid is physically opened on the laptop computer system, the switch gets changed from the system closed to the system being opened. The switch may use an inactive low signal because it is a common type of event source. In an alternate embodiment, the event logic 11 may trigger a second event when the lid closes. The event logic may include some special logic to ensure the event occurrence is not triggered multiple times.

According to one embodiment, the level event is signified by the occurrence of a change in the signal level, from a high to low or from a low to a high. For example, a chassis switch may represent an event source 20. The occurrence of the event may be signified by opening the chassis and thereby causing the signal from the switch to go high. The signal goes low when the chassis is closed. There may be, however, a desire not to continuously trigger the event based on the state. As such, the event logic 11 can be configured 110 to determine an event occurrence based on a signal change from inactive to active, high to low, or vice versa. Further, the event logic 11 can be configured 110 to ignore certain signal changes such as, for example, ignoring transitions from active to inactive as inconsequential events.

Figure 4:
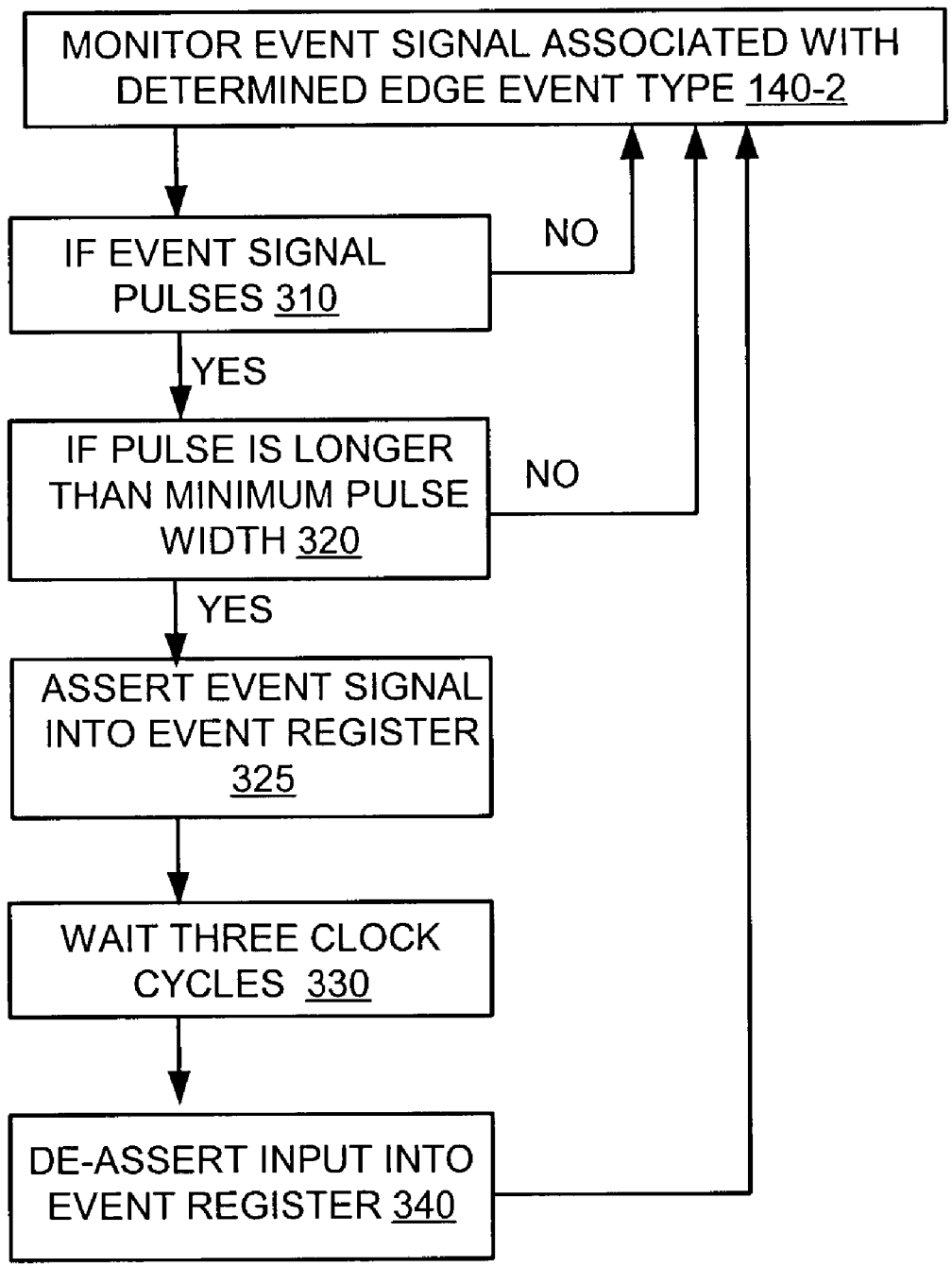
FIG. 4 is a diagrammatic flow chart of another embodiment of the inventive method.

FIG. 4 describes a method 300 of determining an event occurrence for an edge event. Accordingly, if the event type is an edge event type, then the event logic 11 associated with an edge event type is used to determine an event occurrence 300 based on the event type. Determining the event occurrence 300 may include monitoring the event signal 140-2, and determining if the event signal pulses 310. If the event signal does not pulse, then monitoring the event signal 140-2 is continued. If the event signal does pulse, then the length of the pulse is evaluated to determine if the pulse is longer than a minimum pulse width 320. If the pulse is not longer than the minimum pulse width, then the method 300 returns to monitoring the event signal. If the pulse is longer than the minimum pulse width, then the method 300 asserts the event signal into the event register 325. After asserting the event signal into the event register 325, a delay may be initiated such as, for example, waiting for three clock cycles 330. After the delay, the event logic 11 may de-assert the input into the event register at 340 and return to monitoring the event signal 140-2.

According to one embodiment, an edge event occurs if the event signal pulses for a period of time longer than a minimum pulse width, such as the pressing of a button. The change from the first value to the second value, and the subsequent change back to the first value, describe a single edge event. The pressing of a button is typically associated with a momentary switch, such as the pressing and releasing of a button occurring within a short duration, for example a duration of 400 ns.

According to one embodiment, event logic associated with an edge event type may check the duration of the corresponding event signal pulse at step 320. If the pulse is longer than the minimum width, then the logic asserts the event signal 325. The minimum duration may be used to provide debouncing circuitry. Here the intermediate step may be used to verify that the pulse is greater than the specified number of clock cycles. If the pulse is not greater than the minimum width, then the event signal pulse may be ignored. If the pulse is greater than or equal to the minimum pulse width, then the event logic may assert the event signal 325.

Figure 5:
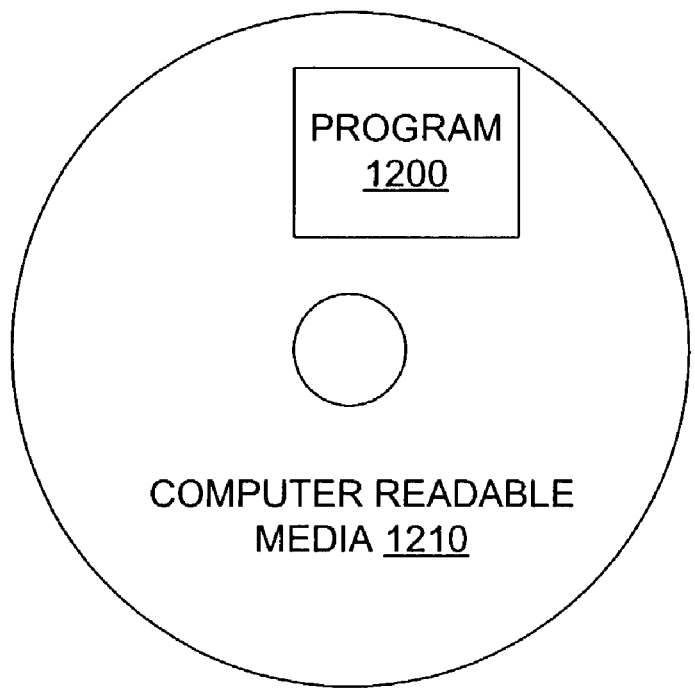
FIG. 5 depicts an embodiment of instructions, for executing a method, on a computer readable media, according to the present invention.

FIG. 5 depicts an embodiment of instructions (e.g. a computer program 1200) for executing a method according to the present invention, on a computer readable storage media 1210. A computer program 1200 representing at least one of the methods described herein, such as for example the method of identifying an event occurrence and the method of configuring the event translator, may be stored on or coupled with the computer readable storage media 1210. The computer program 1200 is stored on or coupled with the computer readable storage media 1210, such that a computing device can read and execute the computer program 1200.

Figure 6:
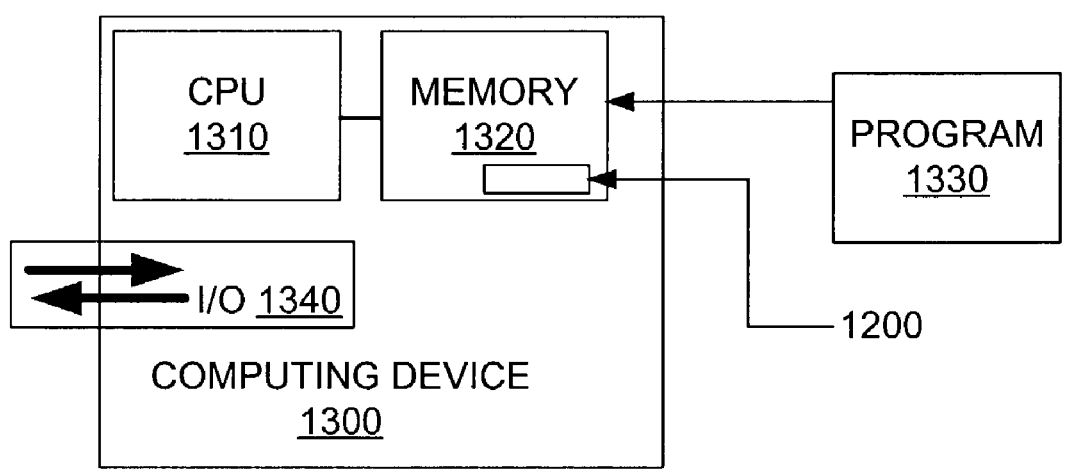
FIG. 6 depicts an embodiment of a computing device executing a method, according to the present invention.

FIG. 6 depicts an exemplary computing device 1300, including a central processing unit (CPU) 1310, a memory 1320 coupled to the CPU 1310, and support for input and output 1340. The computer program 1200 may be loaded into a memory 1320 accessible by the computing device 1300, so that the computing device 1300 can execute the computer program 1200. Alternatively, the computer program 1200 may be permanently embedded in the memory 1320. The support for input and output 1340 typically interacts with the program 1200.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A method for determining an event occurrence for different types of events, the method comprising steps of:
   (a) determining if an event type is an edge event type or a level event type by evaluating an event type register;
   (b) monitoring for the event occurrence based on whether the event type is the edge event type or the level event type, comprising:
      (1) receiving an event signal from an event source, the event signal is a signal type selected from a group consisting of:
   a first signal type and a second signal type; and
      (2) evaluating the event signal over a predetermined duration which is defined by using reference lock cycles and monitoring the event occurrence based on the evaluating event signal and based on whether the event type is the edge event type or the level event type by using an event logic to determine if an event occurs, wherein an event occurs if the received event signal changes from the first signal type to the second signal type and back to the first signal type, and
   wherein the received event signal of the second signal type is received for the predetermined duration, otherwise no event occurs; and
      (3) repeating the receiving step (1) and the evaluating step (2);
   (c) if the event occurs, communicating the event occurrence to an agent by using an output port,
wherein said method is implemented by a computer, and wherein the determining step (a) uses a configuration table stored in a memory to identify the event type as the edge event type or the level event type.

2. The method of claim 1 further including:
   (d) repeating steps (b), and (c).

3. The method of claim 1 further including:
   (d) repeating steps (a), (b), and (c).

4. The method of claim 1 further including:
   (d) configuring the event type prior to step (a).

5. The method of claim 1 further including:
   (d) programming the evaluating step (2) prior to performing the monitoring step (b).

6. The method of claim 1 wherein the first signal type is an inactive signal, and the second signal type is an active signal.

7. The method of claim 1 further including: setting the event type register to identify the event type selected from a group of event types consisting of an edge type and a level type.

8. The method of claim 1 wherein the identifying the event type (a) uses an Advanced Configuration and Power Interface (ACPI) table to identify the event type.

9. The method of claim 1 wherein the identifying (a) is performed in part by evaluating an event type register.

10. The method of claim 1 wherein the communicating (c) uses an event register to communicate the event occurrence to the agent.

11. A system for identifying an event of different event types, comprising:

a first data path for use in determining if an event type is an edge event type or a level event type by evaluating an event type register, wherein the determining step uses a configuration table stored in a memory to identify the event type as the edge event type or the level event type;

a second data path for receiving at least one event signal from an event source, wherein the at least one event signal is a signal type selected from a group consisting of a first signal type and a second signal type;

a memory for storing a event logic for evaluating the at least one event signal over a predetermined duration which is defined by using reference lock cycles and monitoring an event occurrence based on the evaluating event signal and based on whether the event type is the edge event type or the level event type to determine if an event occurs, wherein an event occurs if the received event signal changes from the first signal type to the second signal type and back to the first signal type, and wherein the received event signal of the second signal type is received for the predetermined duration, otherwise no event occurs, and wherein the receiving step performed by the second data path and the evaluating step performed by the event logic are repeated;

a third path for communicating the event occurrence to an agent if the event occurs, wherein the event occurrence is communicated to the agent by using an output port; and a processor for determining the event occurrence using said first data path, said second data path, and processing said event logic.

12. A computer-readable storage medium storing instructions which when executed by a computer to perform a method for determining an event occurrence for different types of events, the method comprising steps of:

(a) determining if an event type is an edge event type or a level event type by evaluating an event type register;

(b) monitoring for the event occurrence based on whether the event type is the edge event type or the level event type, comprising:

(1) receiving an event signal from an event source, the event signal is a signal type selected from a group consisting of:

a first signal type and a second signal type; and (2) evaluating the event signal over a predetermined duration which is defined by using reference lock cycles and monitoring the event occurrence based on the evaluating event signal and based on whether the event type is the edge event type or the level event type by using an event logic to determine if an event occurs, wherein an event occurs if the received event signal changes from the first signal type to the second signal type and back to the first signal type, and wherein the received event signal of the second signal type is received for the predetermined duration, otherwise no event occurs; and (3) repeating the receiving step (1) and the evaluating step (2);

(c) if the event occurs, communicating the event occurrence to an agent by using an output port, wherein said method is implemented by the computer, and wherein the determining step (a) uses a configuration table stored in a memory to identify the event type as the edge event type or the level event type.

* * * * *